US010077538B2

(12) United States Patent
Kriegstein

(10) Patent No.: US 10,077,538 B2
(45) Date of Patent: Sep. 18, 2018

(54) AXIAL REINFORCEMENT SYSTEM FOR RESTORATIVE SHELL

(71) Applicant: Warstone Innovations, LLC, Ventura, CA (US)

(72) Inventor: Stewart Kriegstein, Ventura, CA (US)

(73) Assignee: Warstone Innovations, LLC, Ventura, CA (US)

( * ) Notice: Subject to any disclaimer, the term of this patent is extended or adjusted under 35 U.S.C. 154(b) by 0 days.

(21) Appl. No.: 15/407,234

(22) Filed: Jan. 16, 2017

(65) Prior Publication Data

US 2017/0218591 A1   Aug. 3, 2017

Related U.S. Application Data

(60) Provisional application No. 62/289,718, filed on Feb. 1, 2016.

(51) Int. Cl.
| | |
|---|---|
| *E02D 37/00* | (2006.01) |
| *E04G 23/00* | (2006.01) |
| *E02B 17/00* | (2006.01) |
| *E02D 5/64* | (2006.01) |
| *E02D 5/22* | (2006.01) |

(Continued)

(52) U.S. Cl.
CPC .......... *E02B 17/0026* (2013.01); *B29C 63/06* (2013.01); *B29C 65/48* (2013.01); *B29C 66/431* (2013.01); *E02B 17/0017* (2013.01); *E02D 5/226* (2013.01); *E02D 5/60* (2013.01); *E02D 5/64* (2013.01); *E02D 31/06* (2013.01); *E04F 13/0736* (2013.01); *E04G 23/0218* (2013.01); *B29K 2307/04* (2013.01); *B29L 2031/10* (2013.01); *E02D 2250/0007* (2013.01);

(Continued)

(58) Field of Classification Search
CPC ... E02D 5/60; E02D 31/06; E04C 3/30; E04C 3/34; E04C 3/36; E04F 13/0736; E04G 23/0218; E02B 17/006; E02B 17/0017
See application file for complete search history.

(56) References Cited

U.S. PATENT DOCUMENTS

| | | | | |
|---|---|---|---|---|
| 4,018,055 A | * | 4/1977 | Le Clercq | ................ E02D 5/30 405/257 |
| 4,655,023 A | | 4/1987 | Yung | |

(Continued)

OTHER PUBLICATIONS

PCT International Search Report and Written Opinion, International Application No. PCT/US17/013686, dated Mar. 30, 2017, pp. 1-8.

*Primary Examiner* — Brian D Mattei

(57) ABSTRACT

An axial reinforcement system is disclosed that provides a shell (i.e., a form or jacket) that protects a weight-bearing member (e.g., a cement column) from a corrosive environment and which also substantially increases the structural capacity of the weight-bearing member. The shell is integrated with "positioners" and reinforcing elements, the combination of which offers several advantages over conventional shells. The positioner is attached directly to the shell and the positioner is, in turn, secured to a reinforcing element, which can be a reinforced steel, such as rebar, or a carbon fiber reinforced polymer material. The axial reinforcement system has been found to substantially increase the structural rigidity of the weight-bearing member, while at the same time protecting the weight-bearing member from corrosion and is also simple to install.

20 Claims, 8 Drawing Sheets

(51) Int. Cl.
    *B29C 63/06*     (2006.01)
    *B29C 65/48*     (2006.01)
    *B29C 65/00*     (2006.01)
    *E02D 5/60*     (2006.01)
    *E02D 31/06*     (2006.01)
    *E04F 13/073*     (2006.01)
    *E04G 23/02*     (2006.01)
    *B29K 307/04*     (2006.01)
    *B29L 31/10*     (2006.01)

(52) U.S. Cl.
    CPC ............... *E02D 2300/0021* (2013.01); *E02D 2300/0026* (2013.01); *E02D 2300/0068* (2013.01)

(56) References Cited

U.S. PATENT DOCUMENTS

| | | | |
|---|---|---|---|
| 6,123,485 A * | 9/2000 | Mirmiran | E02D 31/02 405/232 |
| 6,295,782 B1 * | 10/2001 | Fyfe | E04C 3/34 52/2.15 |
| 6,536,991 B1 | 3/2003 | Trader et al. | |
| 6,837,017 B2 | 1/2005 | Hardy, Jr. et al. | |
| 8,628,275 B1 | 1/2014 | Trader, Jr. | |
| 8,650,831 B2 | 2/2014 | Ehsani | |
| 9,376,782 B1 | 6/2016 | Ehsani | |
| 2001/0049919 A1 | 12/2001 | Fyfe | |
| 2008/0072510 A1 * | 3/2008 | Wells | E04C 3/34 52/251 |
| 2009/0314409 A1 | 12/2009 | Ehsani | |
| 2011/0277410 A1 * | 11/2011 | Richardson | E04G 23/0218 52/426 |
| 2012/0124937 A1 * | 5/2012 | Teng | E04B 5/43 52/834 |
| 2013/0084433 A1 * | 4/2013 | Ernst | E04F 13/0733 428/174 |
| 2013/0312350 A1 * | 11/2013 | Kreizinger | E04G 11/00 52/426 |
| 2015/0113913 A1 * | 4/2015 | Kim | E04C 3/34 52/834 |
| 2015/0135635 A1 * | 5/2015 | Richardson | E04G 23/0218 52/742.13 |

* cited by examiner

AXIAL REINFORCEMENT SYSTEM FOR RESTORATIVE SHELL

CROSS-REFERENCE TO RELATED APPLICATIONS

The present invention claim priority to U.S. provisional application No. 62/289,718, filed on Feb. 1, 2016, which application is incorporated herein by reference in its entirety.

BACKGROUND

Piles or columns supporting a vertical load can deteriorate over time, particularly in marine environments. Tides, water currents, salt water abrasion, floating debris, marine insects, wide temperature gradients, and weathering all contribute to deterioration of the column while the column bears a continuous load. Bridges and docks are examples of architectural structures that are supported by columns in marine environments. Columns can be made of concrete, steel, or wood, for example. Deteriorated columns, or more generally, weight bearing members, are typically repaired in place because of the high cost to remove each column for repair or replacement. Marine column restoration is a dangerous and arduous process because the columns often extend several feet under water and are difficult to access. Further, rehabilitating marine columns often must be done quickly because much of the repair takes place while under water. Occasionally, the repair site must be "de-watered" to prevent water from interfering with the column restoration.

Shells or jackets have been introduced to protect columns from further deterioration. Shells are designed to surround the column above and below the area of deterioration. A shell is placed around the column and then grout or an epoxy is poured or pumped into the space between the shell and the column. The shell provides a permanent form that protects the column from further deterioration while retaining the epoxy or cementitious that fills the voids in the column. The epoxy or grout or epoxy also prevents water or environmental corrosives from contacting the damaged portion, or any other covered portion, of the column. However, little structural capacity is added to the column by the shell and epoxy grout combination.

Shells that can both increase the structural capacity of columns and at the same time protect the columns from deterioration are desirable in many situations. For example, bridges that were built several decades ago may be supported by columns that were designed to support smaller loads and comply with less stringent design standards than are required by today's code standards. A bridge built in 1950, for example, may have been designed and built to support trucks up to 40,000 lbs, and would need to be enhanced to support the heavier trucks of today, increased traffic, and more stringent structural codes. Moreover, the columns supporting such a bridge may have deteriorated over time such that the weight-bearing capacity of the bridge has decreased.

Conventional shells are unable to substantially increase the structural capacity of weight bearing members because they do not have positioners, bar supports, or reinforcing members integrated thereon. The present invention has been found to solve many problems inherent in conventional shells and column-restorative procedures.

OVERVIEW

The embodiments disclosed herein increase the structural capacity of construction repair systems, such as a "grout-filled shell systems." In systems developed previously by the present inventor, a manufactured fiberglass shell (for example, Glass Fiber Reinforced Polymer or GFRP) is installed around an existing column made of steel, concrete or wood, for example, which column supports a structure such as a road or a dock, for example. A grout is placed between the column and the inside of the shell. Exemplary grout materials include epoxy or cementitious mixtures. An exemplary cementitious mixture is disclosed in the inventor's corresponding U.S. Pat. No. 9,382,154, filed on Jan. 17, 2014, and entitled "Hygroscopic Cementitious Materials," the disclosure of which is incorporated by reference herein in its entirety. A grout-filled or epoxy-filled shell system is generally utilized when the original structural design capacity of the column has been degraded due to damage, decay, or abrasion of the pile, or when additional strengthening is required or desired for the column. The grout-filled or epoxy-filled shell system can be utilized in a marine environment or underwater, where all of the components are required to be non-corrodible. Existing systems, however, often fail to increase the capacity of a degraded column back to the original design requirements, or to enhanced design requirements, including a factor of safety, as required by design standards, codes, or regulations.

The embodiments disclosed herein address the deficiencies found in earlier systems. Specifically, by providing a fiberglass shell with "positioners" and attaching additional axial reinforcing elements on the interior of the shell, the corresponding additional reinforcement can meet or exceed the required structural design capacity of the column, including a required factor of safety. Exemplary axial reinforcing elements include stainless steel or carbon steel reinforcing bars (e.g., rebar) or laminate shapes composed of carbon-fiber-reinforced polymer (CFRP). These embodiments are not limited to full encapsulations, but they can be utilized when less than full, or half shells, are required, such as supplementing or increasing the structural capacity of strong backs, for example. Moreover, the disclosed embodiments can be used to strengthen standard columns in any environment, and not merely in marine environments.

To provide a shell (i.e., a form or jacket) that protects a column from a corrosive environment and substantially increases the structural capacity of the column, and which can be installed quickly, the present inventor has recognized, among other things, that a shell integrated with "positioners" and reinforcing elements can offer several advantages over conventional shells. In some examples, the shell can include a positioner that is attached directly to the shell and the positioner is, in turn, secured to a reinforced steel, such as rebar. In such examples, the positioners and reinforced steel are positioned away from, and not attached to, the column. Additionally or alternatively, in some examples, the shell can include a positioner attached directly to the shell and which is also secured to a carbon fiber reinforced polymer (CFRP) laminate structure. In such examples, the positioners and CFRP laminate structure are positioned away from, and not attached to, the column. In each example, the positioner can be shaped to correspond to a shape of the reinforcing member, or shaped in such a way that the reinforcing member is easily affixed to the positioner. In some examples, the reinforcing member may extend parallel to a longitudinal axis of the shell. In some examples, several positioners can be used for each reinforcing member; and several reinforcing members can be used with each shell. These exemplary designs can (1) enhance the structural rigidity of the shell and column, (2) protect the column from further corrosion, and (3) be simple to install.

To further illustrate the apparatuses and systems disclosed herein, the following non-limiting examples are provided:

Example 1 is an axial reinforcement system comprising a shell adapted to be wrapped around a column; a positioner attached to the shell; and a reinforcement member secured to the positioner, the reinforcement member extending parallel to a longitudinal axis of the column and the shell.

In Example 2, the positioner in the system of Example 1 can optionally include a concavity shaped to retain and support the reinforcement member.

In Example 3, the system of Examples 1 or 2 can optionally include an adhesive that retains the reinforcement member to the positioner.

In Example 4, the system of any of Examples 1-3 can optionally include a securing element that secures the reinforcement member to the positioner.

In Example 5, the system of any of Example 4 can optionally include a metal or plastic tie as the securing element, and which can wrap around ends or "ears" of the positioner.

In Example 6, the system of any of Examples 1-5 can optionally include an adhesive that retains the positioner to the shell.

In Example 7, the system of any of Examples 1-6 can optionally include a metal rebar, a fiber-reinforced rebar, or a carbon fiber laminate as the reinforcement member.

In Example 8, the system of any of Examples 1-7 can optionally include an epoxy matrix as the material of the positioner.

In Example 9, the system of any of examples 1-8 can be structured such that neither the positioner nor the reinforcement member are attached to the column when they are in an installed configuration around the column.

In Example 10, the system of any of Examples 1-9 can optionally include a plurality of positioners and a plurality of reinforcement members.

In Example 11, the system of any of Examples 1-10 can optionally position the reinforcement members at equally-spaced radial dimensions around the column, or can position the reinforcement members at non-equally spaced radial dimensions around the column.

Example 12 is an axial reinforcement system comprising a shell adapted to be wrapped around a column; a plurality of positioners attached to the shell; and at least one reinforcement member that wraps around the column and which is also secured to the plurality of positioners.

Example 13 is a method of reinforcing a column comprising providing a shell adapted to be wrapped around the column; and attaching a positioner to the shell; securing a reinforcing member to the positioner.

These and other examples and features of the present structures and systems will be set forth by way of exemplary embodiments in the following detailed description. This overview is intended to provide non-limiting examples of the present subject matter and is not intended to provide an exclusive or exhaustive explanation. The detailed description below is included to provide further information about the inventive structures and methods.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present disclosure.

DETAILED DESCRIPTION

The present application relates to systems and methods for pile or column restoration and reinforcement. For example, the present application discloses a shell, one or more positioners attached directly to the shell, and one or more axial reinforcement members attached to the positioners. Additional positioners and reinforcing members may be attached to the shell to further increase structural rigidity of the system. This combination can be wrapped around a column to reinforce and protect a column. Additional details are discussed further below.

Figure 1:
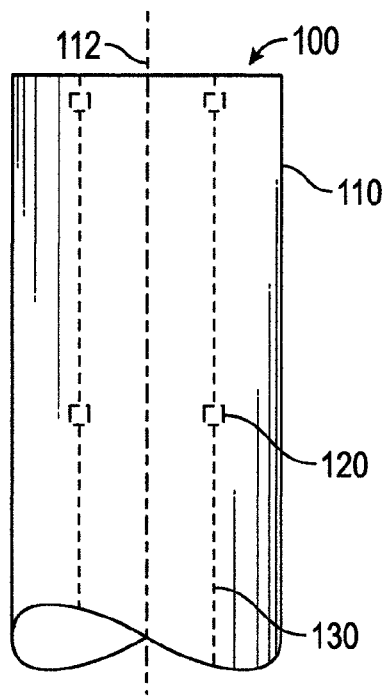
FIG. 1 shows an axial reinforcement system, according to an exemplary embodiment of the invention.
Figures 9A, 9B:
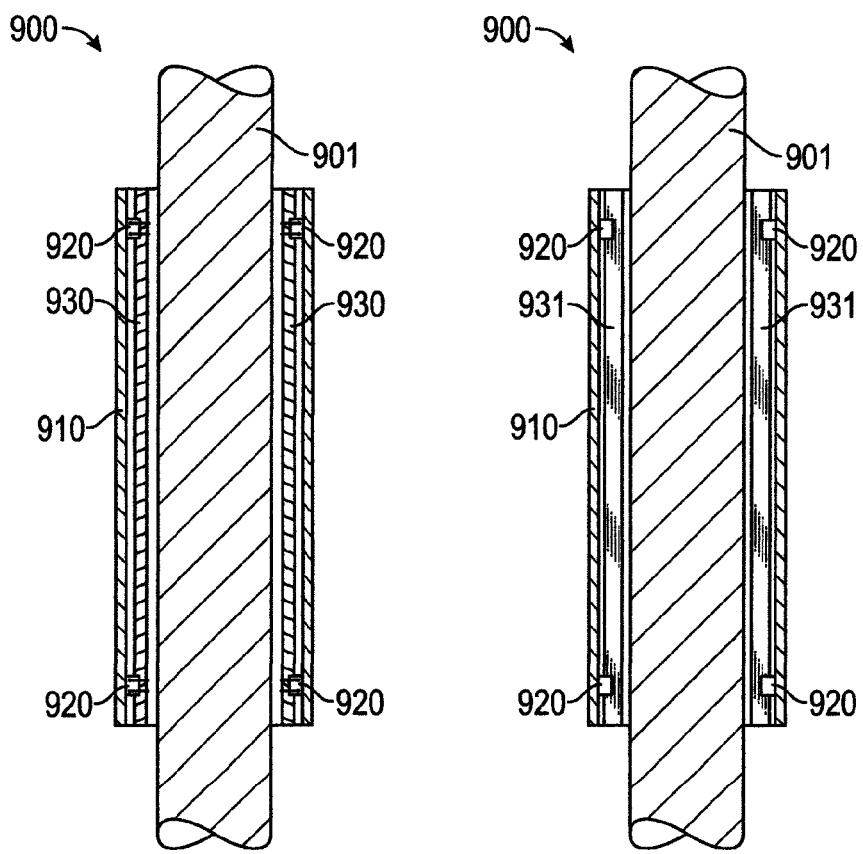
FIGS. 9A-9B show a partial cross-sectional view of exemplary systems applied to a compromised weight-bearing member, the systems having rebar and CFRP laminate, respectively, as the reinforcing members.

FIG. 1 shows an exemplary axial reinforcement system 100. The system can comprise a shell 110 having a longitudinal axis 112, positioners 120, and axial reinforcement members 130. For clarity, the column around which the shell is wrapped is not shown in FIG. 1; but an exemplary column 101 is shown in FIGS. 2 and 9A-9B, and the exemplary column may be a deteriorated or corroded column. The shell 110 can be made out of a hard, solid carbon fiber or a fiberglass material, for example, such that the shell 110 is both lightweight and highly resistant to axial loads. The shell 110 can be pre-formed to be cylindrical, square, rectangular, or partially-cylindrical, such as a semi-circular shape, or can be pre-formed to be H-shaped or I-shaped, for example.

Figure 2A:
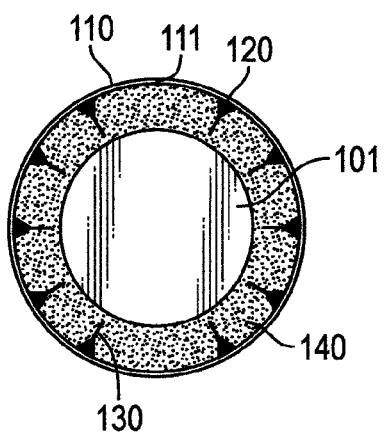
FIGS. 2A-2B show top views of axial reinforcement systems, according to exemplary embodiments of the invention.
Figure 3:
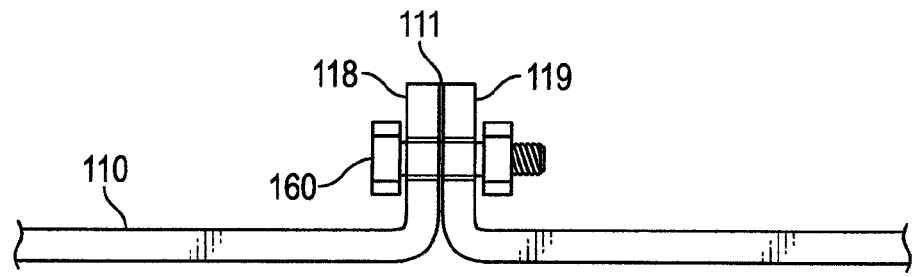
FIG. 3 shows a seam of a shell of an axial reinforcement system with two ends secured together using a mechanical fastener.

The shell 110 can have one or more seams 111 (FIG. 2A) running vertically in a direction of the shell's longitudinal axis 112 such that the shell can be wrapped around the column. In other words, the seam 111 is where two ends of the shell 110 meet. The shell 110 can have an overlap over the seam 111, such as a 1"-8" overlap, to allow one end of the shell to be secured to the other end of the shell along an entire length of the vertical seam 111 of the shell 110. Each end of the shell 110 along the shell's vertical seam 111 may also extend substantially perpendicularly from the shell 110 such that the ends of the shell 110 may be secured together using nuts and bolts and/or an adhesive, as shown in FIG. 3. Several nuts and bolts may be used along the seam 111 of shell 110.

Figure 4:
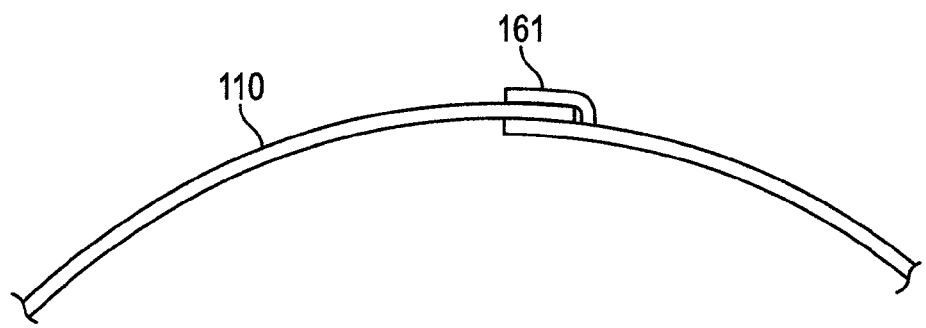
FIG. 4 shows a seam of a shell of an axial reinforcement system with two ends secured together using a tongue-in-groove connection.

A tongue-and-groove structure may alternatively be formed at the shell seam 111, as shown in FIG. 4. One side of the shell 110 may be inserted into a groove 161 on the other side of the shell 110. To secure the ends of the shell 110 together, an epoxy mastic can be used alone or in combination with screws or other securing fasteners, for example, that may be driven through both sides of the groove 161 and through the side of the shell 110 within the groove. Additionally or alternatively, an adhesive may be applied inside the groove 1161 to further adhere the two sides of the shell 110 together. Various other methods may be used to secure the two ends of the shell 110 together.

Figure 2B:
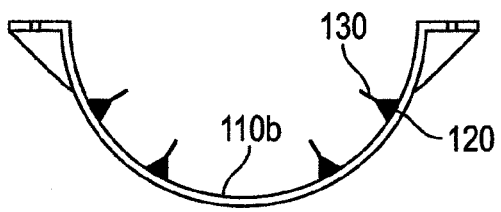

Alternatively, as shown in FIG. 2B, the shell may not have a seam, but may be intended to be a half-shell 110b and wrapped partially around a structure to be reinforced and protected. Regardless, the half-shell 110b shown in FIG. 2B can still use the positioners 120 and reinforcing members 130 disclosed herein.

The positioners 120 may be made out of a high strength epoxy matrix, concrete, wood, metal, plastic, or carbon fiber, for example, or a combination of these. When determining the material of the positioner 120, various considerations should be contemplated, such as cost; durability; structural strength; bond strength with the shell 110, reinforcing member 130, and/or weight-bearing member 101; coefficient of thermal expansion and contraction; compatibility with adhesives that may be used between the positioner 120 and reinforcing member 130, or between positioner 120 and shell 110; compatibility with various grouts or cementitious mixtures that may be used to fill the space between the shell 110 and weight-bearing member 101, thereby enveloping positioner 120; and resistance to corrosion. In an exemplary embodiment, the positioners 120 are made out of a high strength epoxy matrix, which is lightweight, has a small footprint and with simple design configurations can accommodate any shape reinforcement, either steel rebar, FRP rebar or FRP laminates. However, other materials may be used for positioners 120, as referenced above.

Positioners 120 can have a flat bottom surface to allow an adhesive to spread across a wide surface area to better secure the positioner 120 to the shell. Alternatively, the positioner 120 can have a slightly rounded bottom surface to correspond to a rounded interior surface of the shell 110, such that the bottom surface of the positioner 120 has a radius of curvature that corresponds to or equals a radius of curvature of the inside surface of the shell 110. In either case, an adhesive, such as an epoxy paste adhesive, can spread across a wide surface area on the bottom of the positioner 120 to better secure the positioner 120 to the shell 110. Additionally or alternatively, with reference to FIG. 12C, the bottom surface of the positioner 120 facing the shell 110 can have grooves or small concavities incorporated therein to increase an amount of surface area over which the adhesive acts to secure the positioner 120/1201 to the shell 110. FIG. 12C shows a bottom surface of the positioner 1201, but the bottom surface of any of the other positioners disclosed herein may comprise a similar surface.

Exemplary axial reinforcement members 130 can include a reinforcing steel or "rebar;" a fiber-reinforced rebar; or a carbon fiber laminate. The reinforcing members 130 may be round, linear, I-shaped, L-shaped, T-shaped, square, rectangular, or semi-circular, for example, in cross-section. The cross-sectional shape may enhance the securement between the reinforcing member 130 and the positioner 120. Additionally or alternatively, the positioner 120 may be shaped to correspond to a shape of the reinforcing member 130. For example, a reinforcing member 130 may be L-shaped and a concavity in the positioner 120 may likewise be L-shaped. The L-shaped reinforcing member 130 may be inserted into the L-shaped concavity of the positioner 120, which structural interaction alone may retain the reinforcing member 130 to the positioner 120. Additionally or alternatively, an adhesive may be applied to secure the reinforcing member 130 to the positioner 120. Other securing mechanisms may be used to secure the reinforcing member 130 to the positioner 120, as explained in further detail below.

As referenced above, FIG. 2 shows a top view of a the structural reinforcement system 100. Specifically, FIG. 2 shows positioners 120 positioned around an interior circumference of the shell 110. The number of reinforcing members 130 may determine the number of positioners 120 that are attached to the shell 110. One reinforcing member 130 may be secured to the shell 110 using one or a plurality of positioners 120. For example, two positioners 120—one near the top of the shell 110 and one near the bottom of the shell 110—may be used to position and orient a reinforcing member 130. It is advantageous to have a positioner 120 near the top and bottom of the shell 110 so that a person can install the positioners 120 while reaching through the top/bottom of the shell 110. In other examples, a positioner 120 may be placed every 10" to 3', for example, along an axial dimension of the shell 110 and weight-bearing member 101 (e.g., a column). In other examples, a positioner 120 may be placed every 1' to 2' along an axial dimension of the shell 110 and weight-bearing member 101. The amount of desired additional weight-bearing capacity may determine the number of positioners 120 and reinforcing members 130 that are used. By way of example, a single reinforcing member 130 in the form of rebar, installed in accordance with the exemplary embodiments of the present invention, may substantially enhance the weight bearing capacity of the weight bearing member (e.g., column). Similarly, a 3" wide carbon fiber laminate used as the reinforcing member 130, and secured in the positioners 120 disclosed in the present disclosure, may similarly enhance the weight bearing capacity of the weight bearing member. Additional reinforcing members 130 and positioners 120 may be added to further enhance weight-bearing capacity.

In a preferred embodiment, the positioners 120 are attached to the shell 110 prior to arriving at the site of the weight-bearing members 101 that are to be reinforced/repaired. Additionally, the reinforcement members 130 can be secured to the positioners 120, which are attached to the shell 110, prior to arriving at the site of the column 101 that are to be reinforced/repaired. However, the reinforcement members 130 may conveniently be secured to the positioners 120 at the time of installation of the shell 110 around the column 101.

In a preferred embodiment the positioner 120 is attached directly to the shell 110 and does not touch the column 101. Unlike a conventional "spacer," the positioner 120 performs additional functions that a spacer is incapable of performing. The positioner 120 allows the reinforcing members 130 to be pre-assembled to the shell 110 and also spaced a predetermined distance from the shell 110 and column 101, as shown in FIGS. 9A-9B. The distance between the reinforcing member 130 and the underlying column 101 may be established beforehand by controlling the diameter of the shell 110, a height of the positioner 120, and ultimately a distance "$h_1$" from the shell 110 to a top of the reinforcing member (as shown, for example, by "$h_1$" in FIGS. 5 and 7). The distance from the top of the reinforcing member 130 to the outer surface of the column 101 may be determined by $r_s - r_c - h_1$, where $r_s$ is a radius of the shell 110 (to an internal surface of the shell 110) and $r_c$ is a radius of the column 101 (to an external surface of the column 101). By controlling the $r_s$, $h_1$, and $h_2$ variables, a distance between an outer surface of the weight-bearing member (e.g., column) and the reinforcing member 130 (e.g., 530, 730, etc.) may be pre-determined and controlled. Exemplary distances from the reinforcing member 130 to the column 101 include 2-8", or more particularly 2-6", or in a particular example, approximately 2".

The positioners 120 also position the reinforcing members 130 in a proper orientation and position with respect to the shell 110. The distance between the shell 110 and the reinforcing member 130 may be controlled by the structural design of the positioner 120. This distance, shown as "$h_2$" in FIGS. 5-8, may be, for example, with the range of 0.125"-3", or more particularly 0.5"-1". In a preferred embodiment, the distance $h_2$ is approximately 0.75" (+/−0.125").

When wrapping a shell 110 around a column 101, it is important to ensure that the column 101 is concentric with the shell 101, so that the column 101 is in the center of the shell 110 and an even spacing is around the column 101. To ensure that the longitudinal axes of the shell 110 and column 101 are concentric, one or more separate spacers may be placed directly on the column 101, and/or on the reinforcing members 130, and/or on the shell 110.

The positioners 120 disclosed herein operate differently than conventional spacers. In addition to positioning reinforcing members 130 in a proper orientation and position with respect to shell 110 and column 101, positioners 120 also provide another advantage over spacers. When rebar, for example, comes under heavy vertical loads, it has a tendency to bow outward—away from the column. If a conventional spacer is used to merely space the rebar from the column, the spacer is not positioned or structured to prevent the rebar from bowing outward. And even if a spacer were attached to a shell that wraps around a column, the conventional spacer is not designed to secure, bolster, and orient a reinforcing member. By using positioners 120 attached directly to the shell 110, and securing reinforcing members 130 to the positioners 120, when the reinforcing members 130 come under heavy vertical loads, the reinforcing members 130 are prevented from bowing outwards because the positioners 120 are positioned in the "outward" direction in which the reinforcing members 130 would naturally bow. This outward bowing force is transmitted to the positioner 120, which transmits this force to the shell 110. As the shell 110 is made of a carbon fiber reinforced polymer material, and circumscribes, in many situations, the entire column 101, the shell 110 is able to bear much of the outward force, thereby further increasing the structural capacity of the whole system.

Positioners 120 may be attached directly to the underlying weight-bearing member, such as a column 101, but such a process is cumbersome and takes a significant amount of time on-site. By attaching the positioners 120 directly to the shell 110, a substantial amount of time can be saved when installing the protective shell 120 on-site. In a preferred embodiment, the positioners 120 are attached directly to the shell 110. The positioners 120 can be secured to the shell with an adhesive, such as an epoxy paste adhesive. Additionally or alternatively, the positioner 120 may be attached to the shell 110 using a mechanical connection, including a fastener such as a screw or nail, or complimentary mating structures on the shell 110 and the positioner 120, such as a protrusion on the shell 110 and a concavity on the positioner 120. In exemplary embodiments, the positioners 120 are secured to the shell 110 using mechanical fasteners only to retain the adhesive long enough for the adhesive to cure, and the mechanical fasteners are not used to support the reinforcing member 130.

Figure 5:
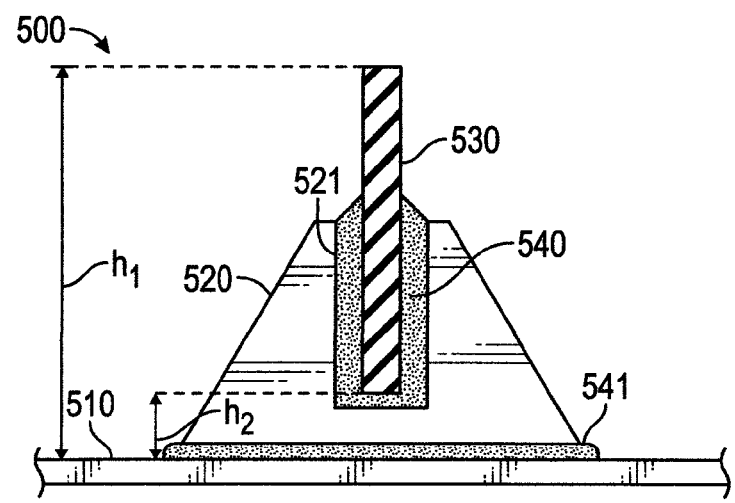
FIG. 5 shows a cross-sectional, axial view of an exemplary axial reinforcement system that uses a CFRP laminate as a reinforcing member.
Figure 6:
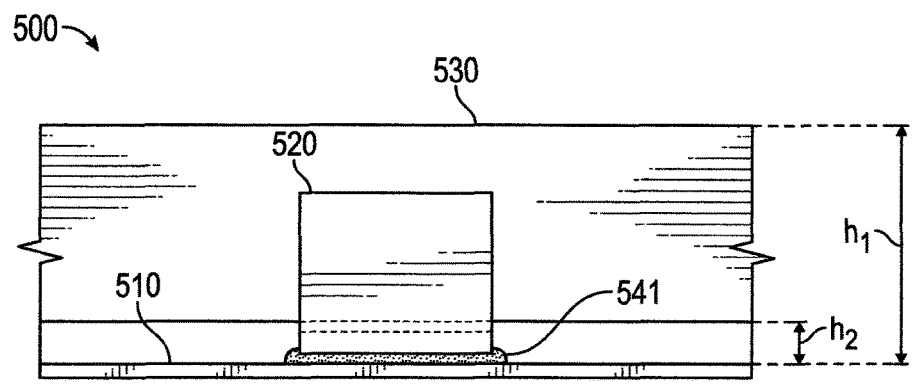
FIG. 6 shows a side view of the system depicted in FIG. 5.
Figure 7:
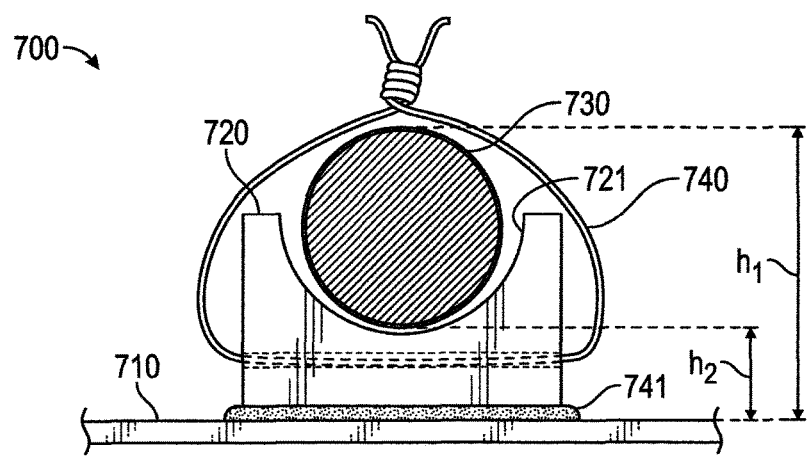
FIG. 7 shows a cross-sectional, axial view of an exemplary axial reinforcement system that uses rebar as a reinforcing member.

The positioner 120 is structured so as to be securable to the shell 110 and to retain an axial reinforcing member 130. For example, the positioner 120 preferably comprises a concave portion for receiving the reinforcing member 130. The concave portion can be sized to correspond to a shape of the reinforcing member 130, as shown in FIGS. 5 and 7. The concave portion can be sized to accommodate an adhesive or other securing element, such as a metal tie or plastic tie, to secure the reinforcing member 130 to the positioner 120. Alternatively, the concave portion can be sized to retain the reinforcing member therein by a friction fit. Exemplary structural features are described below in reference to FIGS. 5-8.

FIG. 5 shows a cross-sectional, axial view of a system 500 corresponding to system 100. Specifically, FIG. 5 shows a positioner 520 structured to secure a CFRP laminate reinforcing member 530 within a concavity 521 built into the positioner 520. The concavity 521 can also be sized to accommodate an adhesive, such as an epoxy paste adhesive 540, as shown in FIG. 5. Preferably, adhesive 540 is compatible with a material type of reinforcing member 530 and positioner 520. A similar or different type of adhesive 541 may be used to secure the positioner 520 to the shell 510. Preferably, adhesive 541 is compatible with a material type of shell 510 and positioner 520. FIG. 6 shows a side view of system 500 depicted in FIG. 5.

Additionally or alternatively, positioners 120/520/720 (generally referred to as 120) can include other structural features to aid in securing the reinforcing members 130/530/730 (generally referred to as 130) to the positioner 120. For example, the positioner 120 can comprise holes to allow securing elements, such as metal or plastic wires or fasteners, to secure the reinforcing member 130 to the positioner 120. Exemplary structural features are described below in reference to FIGS. 7-8.

FIG. 7 shows a cross-sectional, axial view of system 700 corresponding to system 100. Specifically, FIG. 7 shows a positioner 730 structured to secure a rebar reinforcing member 730 within a concavity 721 built into the positioner 720. The concavity 721 can also be sized to accommodate an adhesive, such as an epoxy paste adhesive, though this is not shown in FIG. 7. The positioner 720 can further comprise one or more holes 722 to allow a securing element 740, such as a metal or plastic tie, to pass thru hole 722 and wrap around reinforcing member 730 to secure reinforcing member 730 to positioner 720. The securing element 740 shown in FIG. 7 is not shown in a taut configuration. As securing element 740 is further twisted, it may become more taut to secure the reinforcing element 730 to positioner 720. An adhesive 741, such as an epoxy paste adhesive, may be used to secure the positioner 720 to shell 710. Grooves or small concavities may be located in the bottom of positioner 720 to allow an adhesive 741 to more strongly secure the positioner 720 to shell 710.

Figure 8:
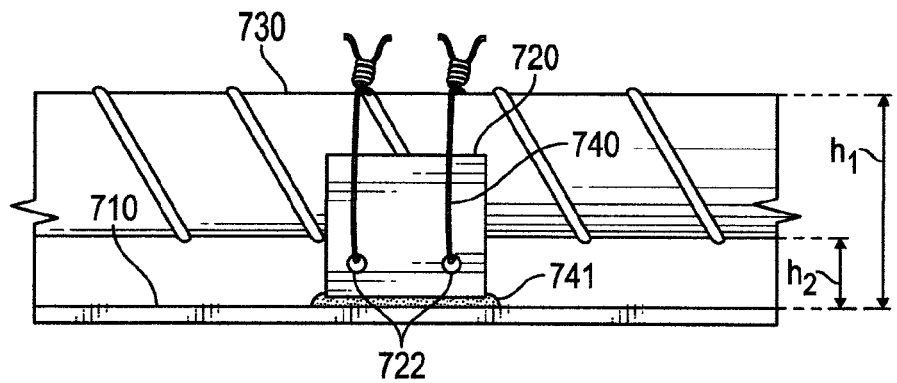
FIG. 8 shows a side view of the system depicted in FIG. 7.

FIG. 8 shows a side view of system 700 depicted in FIG. 7. As shown, one or more holes 722 may be used to wrap one or more securing elements 740 around reinforcing member 730, for the purpose of securing reinforcing member 730 to positioner 720.

Figure 11A:
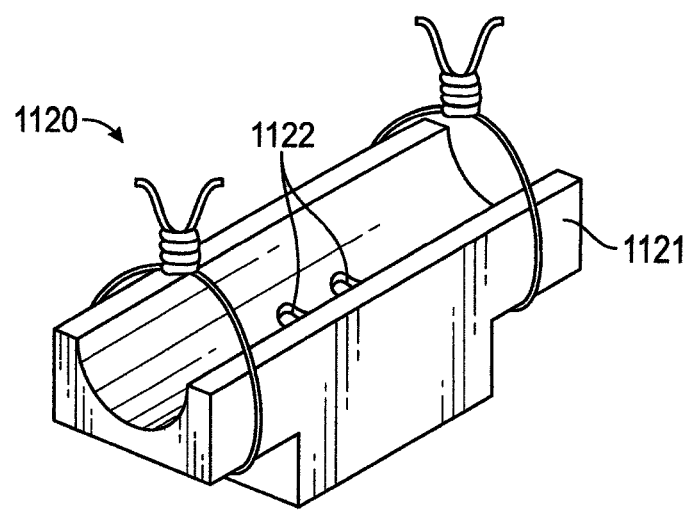
FIGS. 11A-11B show embodiments of exemplary positioners structured for retaining rebar, according to an exemplary embodiment of the invention.
Figure 11B:
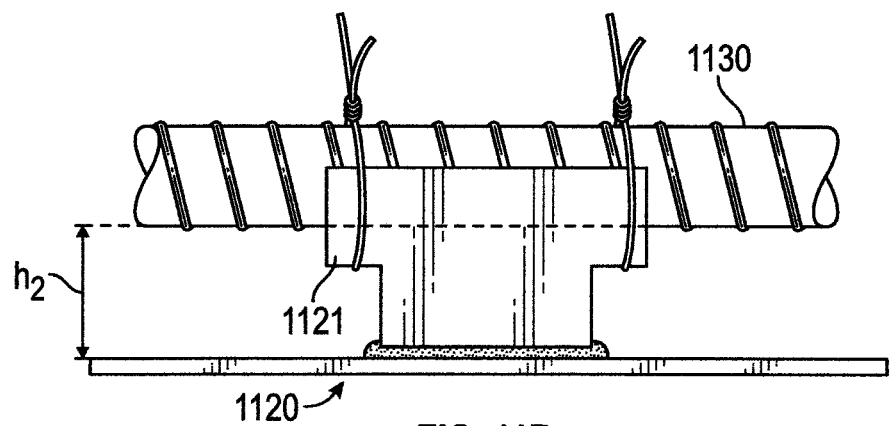

FIGS. 11A-11B show an alternative structure for a positioner 1120 configured to retain a rebar-type reinforcing member, and securing elements are wrapped around "ears" 1121 or ends of the positioner 1120. Positioner 1120 can comprise one or more holes 1122 to allow screws, nails, or other mechanical fasteners to penetrate therethrough, for the purpose of securing positioner 1120 to a shell 110. The mechanical fasteners may be a temporary mechanism for securing the positioner 1120 to the shell 110, and an adhesive applied to a bottom of the positioner 1120 may serve as a more permanent means to secure positioner 1120 to shell 110. FIG. 11B shows a cross-sectional view of the positioner 1120 with a reinforcing member 1130 secured thereto by using a metal or plastic tie wire wrapped around ears 1121 of positioner 1120. Similar to that described above, the positioner 1120 may be configured to space the reinforcing member 1130 from the shell by a distance "$h_2$."

Figure 12A:
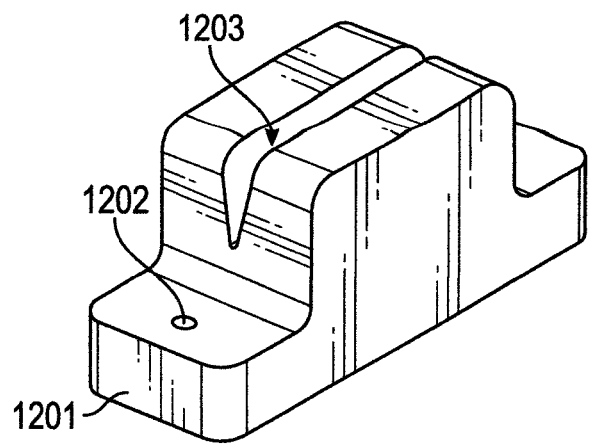
FIGS. 12A-12C show embodiments of exemplary positioners structured for retaining a planer reinforcing member, according to an exemplary embodiment of the invention.
Figure 12B:
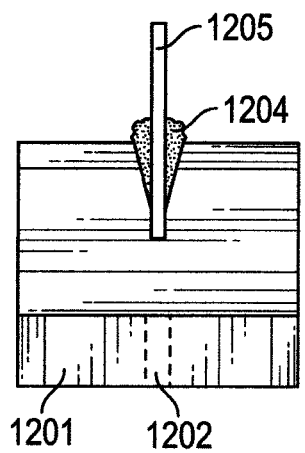
Figure 12C:
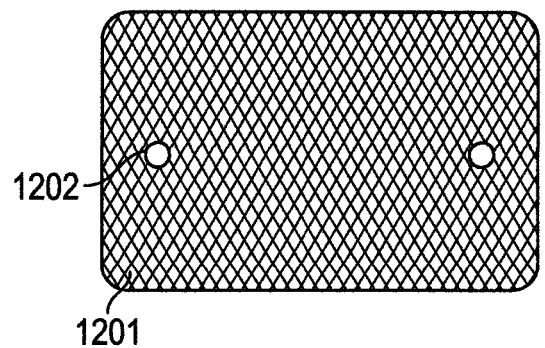

FIGS. 12A-12C show an alternative structure for a positioner 1201 configured to retain a planar-type reinforcing member 1205, such as a CFRP laminate. Positioner 1201 can comprise one or more holes 1202 to allow screws, nails, or other mechanical fasteners to penetrate therethrough, for the purpose of securing positioner 1201 to a shell 110. The mechanical fasteners may be a temporary mechanism for securing the positioner 1201 to the shell 110, and an adhesive applied to a bottom of the positioner 1201 may serve as a more permanent means to secure positioner 1201 to shell 110. FIG. 12B shows an end view of the positioner 1201 with a reinforcing member 1205 secured thereto by an adhesive 1204, such as an epoxy. Similar to that described above, the positioner 1201 may be configured to space the reinforcing member 1205 from the shell by a distance "$h_2$." And as explained above, FIG. 12C shows a bottom view of an exemplary positioner 1201, though the grooves shown thereon can be applied to any of the positioners described herein.

FIG. 9A shows a partial cross-sectional view of an exemplary system 900 applied to a column 901 that may be compromised or deteriorated in some way. The system 900 comprises a shell 910; a plurality of positioners 920 attached to the shell; and a plurality of reinforcing members 930 secured to the positioners 920, with each reinforcing member 930 secured to a plurality of positioners 920. The reinforcing members 930 in FIG. 9A are represented to be a rebar-type reinforcing member. As can be seen, a gap (of size "$h_2$") can be seen between the reinforcing member 930 and the shell 910. Another gap between the reinforcing member 930 and the column 901 can also be seen in FIG. 9A, and this gap distance can be determined as described above, such that this gap can be a pre-determined by controlling a radius of the shell 910, a distance "$h_2$" and a distance "$h_1$," the latter two of which can be controlled by controlling the structure of the positioner 920. One or more additional positioners 920 can be added between the two positioners 920 shown in FIG. 9A, such as a positioner 920 halfway between the two positioners shown in FIG. 9A. Such additional positioner(s) would further aid in preventing reinforcing member 930 from bowing outward or bending in any direction.

The description above with respect to FIG. 9A is equally applicable to FIG. 9B, though FIG. 9B shows a carbon fiber laminate serving as the reinforcing members 931. Similar to FIG. 9A, the positioners 920 are attached directly to the shell 910 and do not touch the column 901. Also similarly, reinforcing members 931 also do not touch the column 901. A tighter bond between positioner 920 and shell 910 may be achieved than between positioner 920 and column 901. Moreover, the positioners 920 may be attached beforehand such that the shell 910 and positioners 920 are ready for installation upon arriving at the location of column 901. In other words, shell 910 and positioners 920 are pre-assembled, and time need not be wasted during installation allowing an adhesive or epoxy between positioners 920 and shell 910 to dry/cure. Thus, the system 900 may be installed very quickly, which is particularly helpful when installing the system 900 in marine environments where the installation may take place underwater, and/or in a water current, and/or in frigid temperatures.

Figure 10:
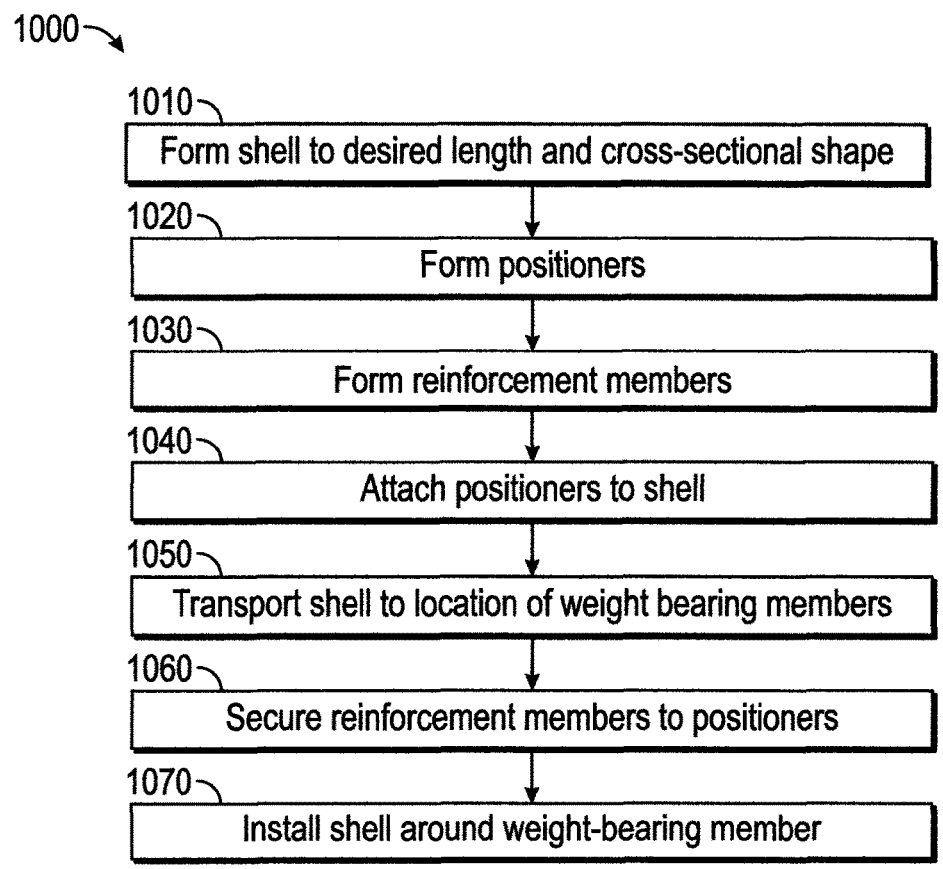
FIG. 10 shows a flow chart of an exemplary method of forming an axial reinforcement system according to exemplary embodiments of the present disclosure.

FIG. 10 shows a flow chart of an exemplary method of forming an axial reinforcement system according to exemplary embodiments of the present disclosure. The steps or operations of the method of FIG. 10 are illustrated in a particular order for convenience and clarity; many of the discussed operations can be performed in a different sequence or in parallel, and some steps may be excluded, without materially impacting other operations. The method of FIG. 10 as discussed, includes operations that may be performed by multiple different actors, devices, and/or systems. It is understood that subsets of the operations discussed in the method of FIG. 10 attributable to a single actor, device, or system could be considered a separate standalone process or method.

In step 1010, a shell 110 is formed to a desired cross-sectional shape and length. For example, the shell 110 could be formed to be a cylinder that fully encapsulates a column 101.

In step 1020, positioners 120 are formed to allow for securing an axial reinforcing member thereto. For example, the positioner 120 can comprise a concavity that extends all the way through positioner 120, and sized to correspond to a reinforcing member that will be placed within that concavity.

In step 1030, reinforcement members may be formed. For example, with respect to carbon fiber laminates, such laminates can be fabricated to comprise one or several layers of carbon fiber reinforced polymer sheets embedded in an epoxy resin. Other types of fibers may be used such as glass or aramid fibers, for example. Further, other types of resins may be used such as ester, vinyl, or polyester, for example.

In step 1040, positioners 120 are attached to the shell formed in step 1010. Such attachment can comprise a mechanical attachment and an adhesive or epoxy attachment, as described above.

In step 1050, the fabricated shell 110 and positioners 120 are transported to a location of weight-bearing members 101.

In step 1060, reinforcement members 130 are secured to the positioners 120, which preferably is performed at a location of the weight-bearing members 101.

In step 1070, the combined shell 110, positioners 120, and reinforcement members 130 are wrapped around weight-bearing member 101 and ends of the shell 110 along a seam 111 are secured to each other such that weight-bearing member 101 is encapsulated by shell 110. A seal may be placed at the bottom of the shell 110 to seal a bottom portion of the void between the shell 110 and the weight-bearing member 101.

In step 1070, the void between shell 110 and weight-bearing member 101 is filled with an epoxy grout or a cementitious mixture. This may be done by pouring or pumping an epoxy grout or cementitious mixture into the void. Thereafter, a belt may be wrapped around the shell 110 and tightened while the epoxy grout or cementitious mixture cures.

In this manner, a shell 110 provided with positioners 120 pre-attached thereto, and reinforcing members 130 thereafter attached to the positioners 120, can protect a column 101 and substantially increase the structural capacity of the column while at the same time being simple to install. More specifically, the embodiments disclosed herein increase the vertical load carrying capacity of the column and moment-resisting capacity of the column.

Figure 13A:
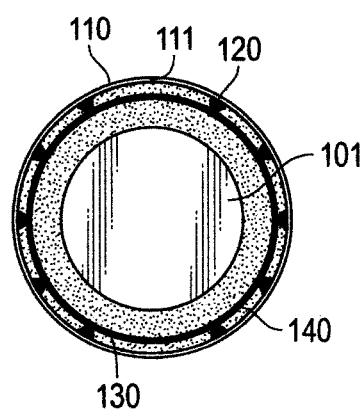
FIG. 13A shows a top view of a reinforcing member wrapped around a column and attached to a plurality of positioners around the shell.

Referring to FIG. 13A, a similar structure to that shown in FIG. 2A is shown, except that the reinforcing member 130 is wrapped around a longitudinal axis of the shell 110 or column 101, and attached to a plurality of positioners 120 within the shell 110. The positioners 120 are attached at different radial and longitudinal positions within the shell 110. The reinforcing member 130 can be a rebar, such as a stainless steel rebar or a carbon fiber rebar, for example.

Figure 13B:
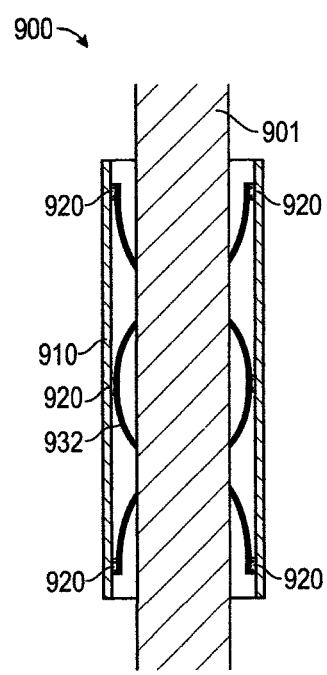
FIG. 13B shows a partial cross-sectional view of the exemplary system of FIG. 13A applied to a weight-bearing member, the system having a reinforcing member wrapped around the column and attached to a plurality of positioners within the shell.

Referring to FIG. 13B, a similar structure to that shown in FIG. 9A is shown, except that the reinforcing member 932 is wrapped around the column 901 instead of in a linear/parallel fashion next to column 901. The system shown in FIG. 13B represents a partial cross-sectional view of the system shown in FIG. 13A. The reinforcing member 932 is wrapped around the column 901 and attached to a plurality of positioners 920 within the shell 910. The positioners are shown on each side of the shell 910, and FIG. 13B shows two reinforcing members 932 wrapped around the column 901, though there need be only one, or there could be more than two. The positioners 920 can comprise a concavity or a through-hole for receiving the reinforcing member(s) 932. The shell 910 and column 901 are shown in cross-section.

Additional Notes

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the detailed description as examples or embodiments, with each claim standing on its own as a separate example, and it is contemplated that such examples can be combined with each other in various combinations or permutations. The scope of the invention should be determined with reference to the appended claims, along with the full scope of equivalents to which such claims are entitled.

The invention claimed is:

1. An axial reinforcement system comprising:
   a shell having a length and configured to be wrapped around a weight-bearing member, the shell having an outer cylindrical surface and an inner cylindrical surface radially-inward of the outer cylindrical surface, the outer and inner cylindrical surfaces extending the length of the shell;
   a positioner having a bottom surface attached, via an adhesive, to the inner cylindrical surface of the shell such that the positioner is located in a void formed between the shell and the weight-bearing member when the shell is wrapped around the weight-bearing member, wherein the bottom surface of the positioner is positioned more radially-inward than the inner cylindrical surface of the shell, and wherein the positioner has at least one hole formed therein, and the positioner is not attached to the weight-bearing member;
   a reinforcement member secured to the positioner and serving to reinforce the weight-bearing member,
   wherein the positioner comprises an elongate concavity to accommodate the reinforcement member and is structured to position and support the reinforcement member within the void when the shell is wrapped around the weight-bearing member, and
   wherein the reinforcement member extends along a longitudinal axis of the shell.

2. The axial reinforcement system of claim 1, wherein the reinforcement member protrudes out of the concavity formed in the positioner.

3. The axial reinforcement system of claim 2, wherein an adhesive is located within the concavity of the positioner and which secures the reinforcement member to the positioner.

4. The axial reinforcement system of claim 2, further comprising a securing element that secures the reinforcement member within the concavity of the positioner.

5. The axial reinforcement system of claim 4, wherein the securing element is a metal or plastic tie wrapped around the reinforcement element.

6. The axial reinforcement system of claim 1, wherein the reinforcement member is wrapped around the column and is attached to a plurality of positioners within the shell.

7. The axial reinforcement system of claim 1, wherein a plurality of positioners is used for each reinforcement member and the plurality of positioners is attached directly to the shell.

8. The axial reinforcement system of claim 1, wherein the reinforcement member comprises one selected from the group consisting of a metal rebar, a fiber-reinforced rebar, and a carbon fiber laminate.

9. The axial reinforcement system of claim 1, wherein the positioner is made of an epoxy matrix.

10. The axial reinforcement system of claim 1, further comprising an epoxy grout placed within the void to secure the shell to the weight-bearing member.

11. The axial reinforcement system of claim 1, wherein neither the positioner nor the reinforcement member are attached to the weight-bearing member when in an installed position.

12. The axial reinforcement system of claim 1, wherein the shell is a half-shell and the half-shell not having a seam, the shell being wrapped partially around the weight-bearing member.

13. The axial reinforcement system of claim 1, wherein the positioner and the reinforcement member are spaced apart from the weight-bearing member so as to avoid contact with the weight-bearing member.

14. The axial reinforcement system of claim 1, wherein the bottom surface of the positioner is attached to the inner cylindrical surface of the shell with an adhesive.

15. The axial reinforcement system of claim 14, wherein the bottom surface of the positioner comprises grooves that allow the adhesive to more securely attach the positioner to the inner cylindrical surface of the shell.

16. A method reinforcing a weight-bearing member, comprising:
providing a shell configured to be wrapped around the weight-bearing member, the shell having an outer cylindrical surface and an inner cylindrical surface radially-inward of the outer cylindrical surface;
attaching a bottom of a positioner, via an adhesive, to the inner cylindrical surface of the shell such that the positioner is located in a void formed between the shell and the weight-bearing member when the shell is wrapped around the weight-bearing member, wherein a bottom surface of the positioner is attached to the inner cylindrical surface of the shell with an adhesive and/or a mechanical fastener, and after such attaching the bottom surface of the positioner is more radially-inward than the inner surface of the shell, and wherein the positioner has at least one hole formed therein, and the positioner is not attached to the weight-bearing member; and
securing a reinforcement member to the positioner, the reinforcement member extending along a longitudinal axis of the shell and serving to reinforce the weight-bearing member,
wherein the positioner comprises an elongated concavity to accommodate the reinforcement member and is structured to position and support the reinforcement member within the void when the shell is wrapped around the weight-bearing member.

17. The method of claim 16, wherein the reinforcement member protrudes out of the concavity formed in the positioner.

18. The method of claim 17, wherein a plurality of positioners is used for each reinforcement member and the plurality of positioners is attached directly to the shell and not attached to the weight-bearing member.

19. An axial reinforcement system comprising:
a shell configured to be wrapped around a weight-bearing member, the shell having a seam where two ends of the shell meet, the seam running vertically in a direction of a longitudinal axis of the shell, the shell having an outer surface and an inner surface radially-inward of the outer surface;
a positioner having a bottom surface attached, via an adhesive, directly to the inner surface of the shell such that the positioner is located in a void formed between the shell and the weight-bearing member when the shell is wrapped around the weight-bearing member, wherein the bottom surface of the positioner is positioned more radially-inward than the inner surface of the shell, and the positioner has at least one hole formed therein, and the positioner is not attached to the weight-bearing member;
a reinforcement member secured to the positioner and serving to reinforce the weight-bearing member,
wherein the positioner comprises a concavity to accommodate the reinforcement member and is structured to position and support the reinforcement member within the void when the shell is wrapped around the weight-bearing member,
wherein the positioner and reinforcement member are spaced apart from the weight-bearing member, and
wherein the reinforcement member extends along a longitudinal axis of the shell.

20. The axial reinforcement system of claim 19, wherein two ends of the shell that meet at the seam are secured together with a tongue-and-groove structure or a bolted connection.

* * * * *